Figure 4:
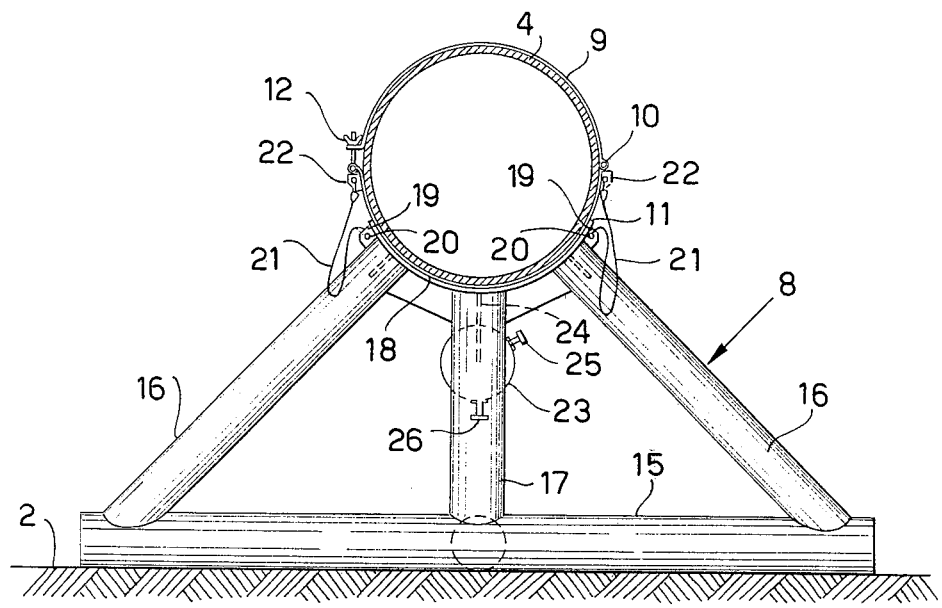

United States Patent [19]

Rosa et al.

[11] 4,329,086
[45] May 11, 1982

[54] METHOD FOR LAYING AN UNDERWATER PIPE TO STRADDLE AN ALREADY LAID PIPE, AND THE RELATIVE DEVICES

[75] Inventors: Giovanni Rosa; Ambrogio Scodino, both of S. Donato Mi, Italy

[73] Assignee: Saipem S.p.A., Milan, Italy

[21] Appl. No.: 152,763

[22] Filed: May 23, 1980

[30] Foreign Application Priority Data

Jun. 20, 1979 [IT] Italy ............................. 23746 A/79

[51] Int. Cl.³ .............................................. F16L 1/04
[52] U.S. Cl. ................................. 405/171; 138/106; 248/49
[58] Field of Search ............... 405/158, 166, 171, 157, 405/168; 138/106, 107; 14/1; 248/49, 74 R

[56] References Cited

U.S. PATENT DOCUMENTS 2,846,168 8/1958 Schroeter ............................. 248/49
3,466,881 9/1969 Lamy .................................. 405/166
3,620,028 11/1971 Wilde ................................. 405/171
4,059,872 11/1977 Delesandri .................... 248/74 R X
4,138,853 2/1979 Lamy .................................. 405/171

FOREIGN PATENT DOCUMENTS 1286529 1/1969 Fed. Rep. of Germany ............ 14/1

Primary Examiner—Ernest R. Purser
Attorney, Agent, or Firm—Morgan, Finnegan, Pine, Foley & Lee

[57] ABSTRACT

Method and apparatus for laying an underwater pipe to straddle an already laid pipe, comprising fastening to the pipe to be laid, at appropriate distances apart, a set of trestles the heights of which are gradually increasing and decreasing consistent with the bend to be imparted to the pipe to be laid in order to have it positioned in the correct straddling relationship relative to the already laid pipe. Each trestle is connected to the pipe to be laid by flexible means which allow the trestle to move vertically, longitudinally and traversely relative to the pipe and to be suspended below and separate from the pipe as the pipe and trestle descend to the sea bed for proper positioning of the trestle substantially independent of the pipe.

8 Claims, 5 Drawing Figures

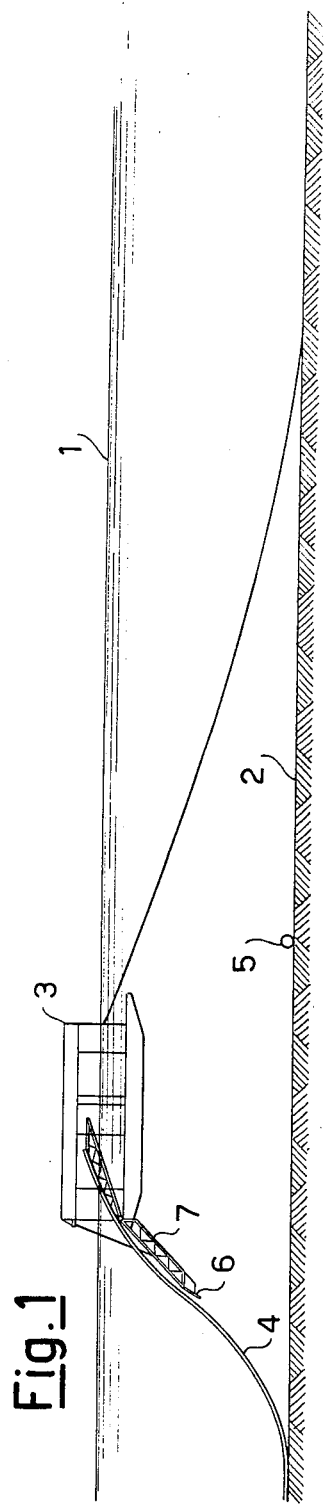
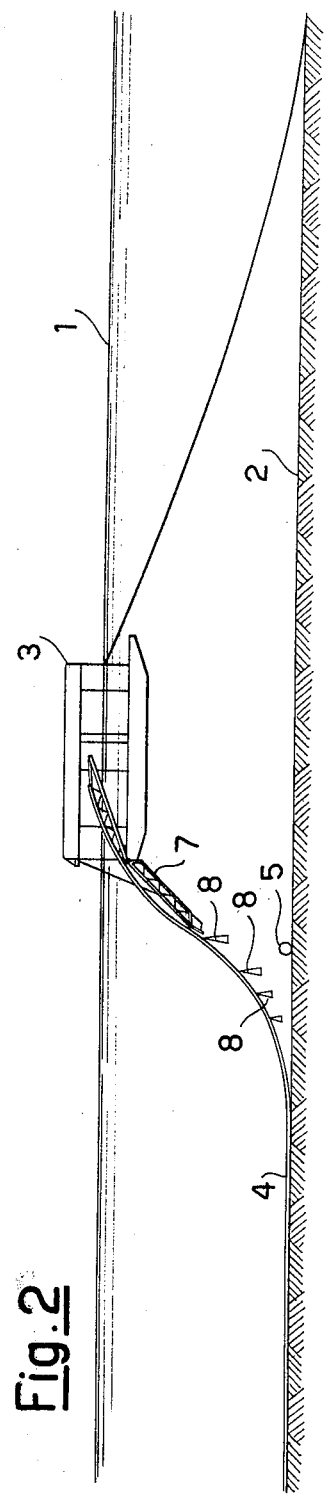
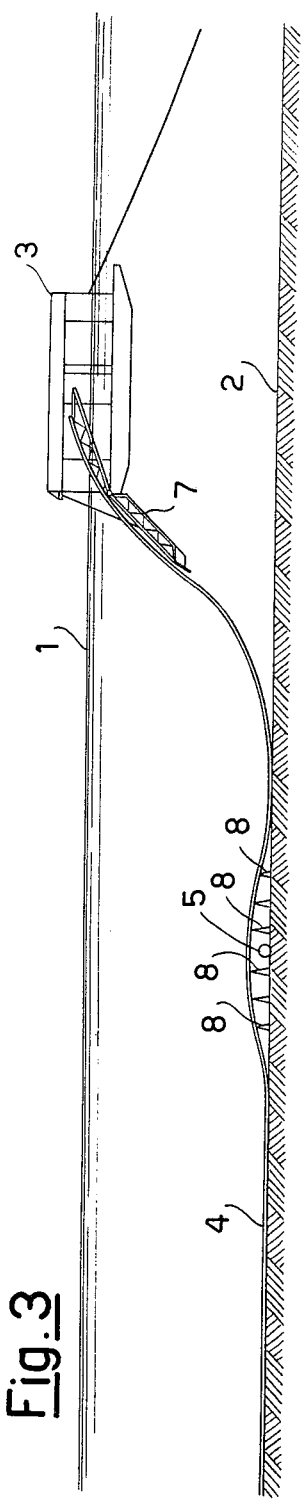

METHOD FOR LAYING AN UNDERWATER PIPE TO STRADDLE AN ALREADY LAID PIPE, AND THE RELATIVE DEVICES

This invention relates to laying an underwater pipe such that it straddles obstacles in its path, where these obstacles must not undergo damage during the laying operation. Such obstacles, which may be present on a bed of water, include other already laid items, such as other pipe, underwater cable or the like.

The present invention relates to a method for laying an underwater pipe such that it straddles obstacles, and to the means and devices for straddling obstacles.

Although the method and devices according to the invention are suitable for a laying operation involving the straddling of any obstacle, reference will be made herein for simplicity to straddling another laid pipe.

In general, the straddling of another laid item requires the arrangement of supports over determined sections of the pipe to be straddled. These supports vary in height such that they increase and then decrease, so that when the straddling operation is finished, the laid pipe is suitably radiused in a bridge-shaped line above the obstacle, i.e., the already existing pipe. The operation involved in laying a pipe to straddle a pipe already laid on the bed must be carried out in the shortest possible time. This is both for economy reasons to contain the operating costs of the labour and nautical craft involved, and because the optimum atmospheric and sea conditions for these particularly delicate straddle-laying operations occur only during brief periods of the year.

The most widespread straddling method for laying a pipe comprises:

Temporary supports such as sand bags or the like are laid on the sea bed along the pipe laying line, and generally along a line perpendicular to the longitudinal axis of the already laid pipe. This operation is carried out by a surface nautical craft, aided in deep water by a submersible craft.

The nautical craft simply rests the straddling pipe on the previously disposed sand bags. If the operation is correctly carried out, the pipes do not crush each other at the cross-section where straddling takes place.

A nautical craft provided with lifting cranes on one of its sides then raises a portion of straddling pipe above the sand bags, and a submersible craft provided with grips removes the sand bags and then arranges the final concrete supports of varying height with the aid of the surface craft. When these operations have been carried out, the surface craft lowers the previously raised pipe portion, so that the straddling pipe follows the arc above the straddled pipe, supported by the concrete supports.

The object of the present invention is to obviate the drawbacks of the aforesaid method which results from the complexity and delicacy of the operation.

In the method according to the present invention, support trestles of a special form are mounted on the pipe during the actual assembly and laying operation, so that when laying is effected they provide a bridge configuration above the straddled pipe, without any further action by nautical craft. According to the method of the present invention, the pipe laying movement is momentarily stopped when the first pipe section and the first support trestle of a relatively small height have reached the end of the launching ramp.

Divers from a small depot ship fix two half collars around the section concerned, which are provided with bored lugs from which the first trestle is suspended by cables or other connections flexible connecting means.

According to a preferred embodiment of the invention, the trestles used have a slightly negative buoyancy, i.e. their actual weight slightly exceeds the weight of the displaced water, to the extent determined by the quantity of air present in a spherical or other shaped container, with which the trestle is provided. The trestle thus remains suspended below the pipe section being laid and at a certain distance from it, so as to enable it to be exactly positioned on the sea bed under the pipe being laid.

This is done by a diver in shallow water or a submersible craft in deep water, operating with handling grips when the section concerned reaches the sea bed.

The pipe laying movement is again started, and is then halted when the next predetermined pipe section to which the second collar is to be fixed, has reached the end of the launching ramp.

The new collar with a trestle of greater height than the first is then fixed to the new pipe section at the ramp, and the successive operations are carried out to provide a series of trestles of initially increasing and then of decreasing height suspended from various predetermined pipe sections.

The pipe to be laid, equipped in this manner, is launched and as the trestles touch the sea bed, their verticality and positions are adjusted by the diver or the grips of the submersible craft, and the pipe then halts on the underlying trestles thus disposed, nullifying the small distances which separate them and assumes the required bridge configuration over the pipe already laid on the bed.

According to a further characteristic of the invention, in that the fixing collars each include two half collars which are connected together at one end by a hinge and which can be fixed together at the other end by a threaded bolt located on one half collar that is passed through a bored lug on the other half collar and tightened by a nut or wing nut. Alternatively, other known quick connection systems can be used. This particular arrangement limits the torsional stresses which a rigid collar could introduce during laying. The half collar disposed in the lower position is provided with two lugs by means of which the temporary connections are made to the support trestle using pieces of cable or chains, and the support trestle is provided with two similar lugs at its top.

In a preferred embodiment of the invention, the trestle includes two inclined triangular frames connected together at their base by a cross member and at their upper vertex by a seat in the form of a curved metal plate with a radius of curvature equal to the radius of the pipe to be supported and stiffened by strengthening brackets.

The laid pipe is simply supported on said seat, and is thus retained in a transverse direction but is free to make any settling movements in a longitudinal direction.

The trestle is also provided internally below the support seat with a container fitted with a connector comprising a non-return valve for feeding air which adjusts the degree of floating of the trestle.

At the beginning, the container is full of water, and as the compressed air is fed it displaces the water, which escapes from another appropriately provided valve.

The overall buoyancy varies according to the quantity of water which is removed and replaced in volume by the fed air. Said container, which is cylindrical or spherical, can be either rigid with the trestle or can be connected to it so that it can be removed when the pipe laying is completed, i.e. when it is no longer required.

Figure 5:
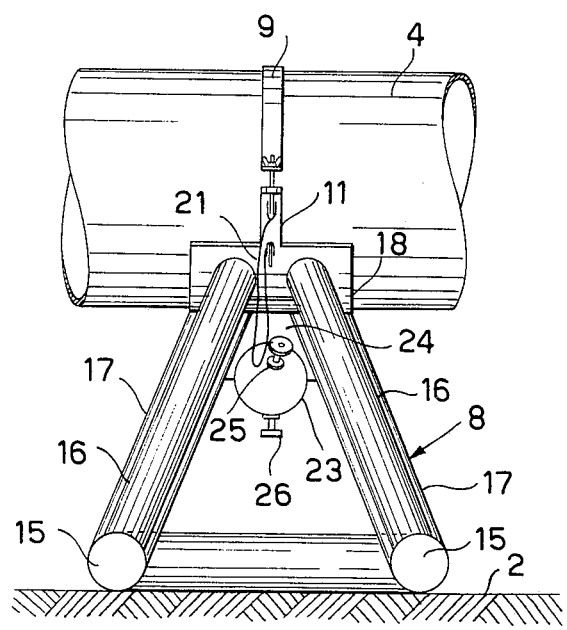

The invention will be more apparent from the description of one embodiment given hereinafter by way of non-limiting example with reference to the drawings, in which:

FIGS. 1, 2 and 3 are diagrammatic side views of the successive stages in laying the pipe, showing the pipe initially without the trestles, then fitted with them for straddling purposes and finally laid in a straddle configuration, FIG. 4 is a front view of the trestle already supporting the straddling pipe, FIG. 5 is a side view of the trestle of FIG. 4.

With reference to the FIGS. 1-3, the reference numeral 1 indicates the sea surface and 2 its bed, 3 the nautical craft for laying the pipe 4 straddling the already laid pipe 5, 6 the terminal part of the launching ramp 7, and 8 the support trestles. As shown in FIGS. 4-5. The upper half ring 9 is tightened around said pipe 4 by rotating it about the hinge 10 which connects it to the lower half ring 11, and to which it is fixed by tightening the wing nut 12 on the bolt 13 inserted through the bore in the terminal part 14 of said half ring 9. The trestle 8 is composed of the two tube pieces 15 which form its base, and to which are welded the tube pieces 16 and 17 to form the side support frame, these being welded at their top to the curved metal plate 18 which is to support the pipe 4. Said plate 18 is fitted with the two lugs 19 provided with the two bores 20 through which the two pieces of cable 21 pass to connect said trestle 8 to the bored lugs 22 provided on said lower half ring 18. Said trestle 8 is also provided with the sphere 23 welded to the cross member 24 and provided with the connector 25 fitted with a non-return valve for filling it with the quantity of air necessary to maintain a small overall negative buoyancy for said trestle 8.

The water displaced by the air fed through 25 escapes from the connector 26, which is also provided with a non-return valve.

The laying of an underwater pipe with straddling according to the method and devices of the present invention is carried out simply and reliably in that any contact between the two pipes is prevented, and underwater operations are limited to adjusting and checking the position of the trestle, which is lowered on to the sea bed by the pipe itself during the laying operation. Any further action by surface craft or underwater craft is avoided, and any force on the pipe is prevented.

We claim:

1. An improved method for launching and buoying an underwater pipe to straddle obstacles which must not suffer damage, such as other laid pipe or underwater cable, which utilizes a series of trestles of initially increasing and then decreasing height for straddling the pipe, comprising:
   connecting the appropriate trestle to a section of the pipe by flexible means which allows the trestle to be suspended below and separate from the pipe section so as to be able to move vertically, longitudinally and transversely relative thereto;
   launching the trestles and pipe and lowering them to the sea bed with the connected pipe above and separated from the trestle by the flexible means so that the trestle can be moved independently of the pipe for proper positioning of the trestle on the sea bed adjacent to the obstacle; and
   allowing the descending pipe to be halted and supported by the properly positioned trestles for straddling the obstacle.

2. An improved method for laying an underwater pipe to straddle obstacles, as claimed in claim 1, wherein during the launching operation each trestle of the series is connected to the pipe by collars provided with lugs from which the trestle is suspended by flexible cable or chain portions.

3. Connection collars as claimed in claim 2, including two half collars hinged together at one end and fixable together at their other end by a threaded bolt with a nut or a wing nut.

4. A method for laying a straddling underwater pipe as claimed in claim 1, wherein the trestle includes means for adjusting its buoyancy and wherein said buoyancy is adjusted to a slightly negative value.

5. The method, as claimed in claim 1, wherein said flexible means includes a flexible cable.

6. The method, as claimed in claim 1, wherein each trestle includes a curved plate which inhibits the transverse movement of the supported pipe while allowing longitudinal movement thereof.

7. Apparatus for laying an underwater pipe to straddle obstacles which must not suffer damage, such as other laid pipe or underwater cable, which utilizes a series of trestles of initially increasing and then decreasing height for straddling the pipe, comprising:
   flexible means connected to a trestle and a pipe section of the pipe to be laid over the obstacle, wherein said flexible means allows the trestle to be suspended below and separate from the pipe as they descend to the sea bed adjacent to the obstacle and to be moved vertically, longitudinally and transversely relative to the pipe for proper positioning of the trestle on the sea bed; and
   support means on the trestle for halting and supporting the pipe and for straddling such pipe over the obstacle.

8. A trestle for supporting straddling underwater pipes as claimed in claim 1, wherein each trestle is provided with a container fitted with a non-return valve to enable the overall buoyancy of the trestle to be adjusted to the required value by varying the water quantity contained in said container by introducing compressed air to allow the trestle to descend below and separately from the pipe trestle.

* * * * *

UNITED STATES PATENT AND TRADEMARK OFFICE
CERTIFICATE OF CORRECTION

PATENT NO. : 4,329,086
DATED : May 11, 1982
INVENTOR(S) : Giovanni Rosa & Ambrogio Scodino It is certified that error appears in the above-identified patent and that said Letters Patent are hereby corrected as shown below:

Col. 2, line 4, delete "connections";

Col. 3, line 24, after "4-5" change " . (period) The" to read -- , (comma) the--; and Col. 4, line 54, change "claim 1" to --claim 7--.

Signed and Sealed this

Tenth Day of August 1982

[SEAL]

Attest:

Attesting Officer

GERALD J. MOSSINGHOFF
Commissioner of Patents and Trademarks